(12) United States Patent
Koh

(10) Patent No.: US 9,661,929 B1
(45) Date of Patent: May 30, 2017

(54) TOPPLE-PROOF BUFFERING STRUCTURE FOR A CHAIR

(71) Applicant: HARVEST-EXCEL INTERNATIONAL PTE. LTD., Taichung (TW)

(72) Inventor: Tuang-Hock Koh, Taichung (TW)

(73) Assignee: Harvest-Excel International Pte. Ltd., Taichung (TW)

( * ) Notice: Subject to any disclaimer, the term of this patent is extended or adjusted under 35 U.S.C. 154(b) by 3 days.

(21) Appl. No.: 15/006,068

(22) Filed: Jan. 25, 2016

(51) Int. Cl.
| | |
|---|---|
| A47C 7/14 | (2006.01) |
| A47C 3/029 | (2006.01) |
| B60N 2/38 | (2006.01) |
| A47C 9/00 | (2006.01) |
| A47C 3/025 | (2006.01) |

(52) U.S. Cl.
CPC .............. *A47C 7/14* (2013.01); *A47C 3/025* (2013.01); *A47C 3/029* (2013.01); *A47C 9/002* (2013.01); *B60N 2/38* (2013.01)

(58) Field of Classification Search
CPC ........... A47C 9/002; A47C 7/14; A47C 3/029; A47C 3/025; B60N 2/39; B60N 2/38
USPC ................... 297/310, 259.1, 258.1, 313, 314
See application file for complete search history.

(56) References Cited

U.S. PATENT DOCUMENTS

| | | | | |
|---|---|---|---|---|
| 2,132,291 A | * | 10/1938 | Fitos ....................... | A47C 3/025 248/415 |
| 2,729,273 A | * | 1/1956 | Hamilton ............... | A47C 7/441 248/576 |
| 3,101,971 A | * | 8/1963 | Hampton .............. | A47C 1/0345 297/259.1 |
| 3,315,934 A | * | 4/1967 | Taylor ...................... | B60N 2/38 137/45 |
| 3,784,148 A | * | 1/1974 | Hill ........................ | A47C 3/025 248/582 |
| 3,813,069 A | * | 5/1974 | Fletcher .................. | A47C 3/026 248/188.1 |
| 4,025,020 A | * | 5/1977 | Goff ........................ | A47C 3/025 248/582 |
| 4,372,606 A | * | 2/1983 | Faull ...................... | A47C 3/025 297/265.1 |
| 4,871,208 A | * | 10/1989 | Hodgdon ................ | A47C 3/026 248/575 |
| 5,567,009 A | * | 10/1996 | Fay et al. ................ | A47C 3/027 297/258.1 |
| 5,795,028 A | * | 8/1998 | Dussia, Jr. ............ | A47C 13/005 248/220.1 |

(Continued)

*Primary Examiner* — Syed A Islam
(74) *Attorney, Agent, or Firm* — Rosenberg, Klein & Lee

(57) ABSTRACT

A topple-proof buffering structure for the chair comprises an elastic supporting plate having two deforming buffering portions protruded from an outer side of a fixing substrate, a seat fixing plate assembled to a bottom side of a seat of the chair, and at least two flexible pillars respectively having a bolt member, a screw hole member, and a limit screw. The bolt member has an embedding end and an outer threading section. An inner screw hole is arranged at a surface of the embedding end. One end of the screw hole member opposite to the screw hole has a small diameter hole and a retaining lip. The limit screw is passed through the small diameter hole of the screw hole member and screwed in the inner screw hole of the bolt member so as to support the flexible pillars not to be damaged and broken.

4 Claims, 8 Drawing Sheets

(56) References Cited

U.S. PATENT DOCUMENTS

| | | | | |
|---|---|---|---|---|
| 6,209,843 B1* | 4/2001 | Smith, Jr. | ............ | A47C 3/0252 |
| | | | | 248/346.01 |
| 6,827,401 B2* | 12/2004 | Marshall | ............ | A47C 1/03255 |
| | | | | 297/302.1 |
| 7,100,983 B1* | 9/2006 | Gant | ............ | A47C 7/14 |
| | | | | 108/2 |
| 7,806,479 B2* | 10/2010 | Jensen | ............ | A47C 9/002 |
| | | | | 248/158 |
| 7,922,247 B2* | 4/2011 | Dickie | ............ | A47C 7/446 |
| | | | | 297/264.1 |
| 8,888,184 B2* | 11/2014 | Meyer | ............ | A47C 3/0252 |
| | | | | 297/258.1 |
| 2003/0132652 A1* | 7/2003 | Caldwell | ............ | A47C 3/025 |
| | | | | 297/258.1 |
| 2005/0029845 A1* | 2/2005 | Maki | ............ | A47C 3/027 |
| | | | | 297/258.1 |
| 2007/0241599 A1* | 10/2007 | Hodgdon | ............ | A47C 1/023 |
| | | | | 297/313 |
| 2010/0060057 A1* | 3/2010 | Ballendat | ............ | A47C 7/445 |
| | | | | 297/258.1 |
| 2012/0306249 A1* | 12/2012 | Jung | ............ | A47C 3/026 |
| | | | | 297/313 |
| 2014/0252824 A1* | 9/2014 | Saint Pierre | ............ | A47C 3/04 |
| | | | | 297/239 |

* cited by examiner

TOPPLE-PROOF BUFFERING STRUCTURE FOR A CHAIR

BACKGROUND OF THE INVENTION

1. Field of the Invention

The present invention relates to a chair structure, and especially relates to a topple-proof buffering structure for the chair.

2. Description of Related Art

I the field of chair, the sitting feeling and comfort of a seat of a chair is gradually requested due to the improvement of the technical skills. Therefore, an elastic buffering structure is designed within the seat of the chair.

Please reference to U.S. patent no. 2014/0252824 A1 (hereafter referred to '824), the structure is shown as in FIG. 6. Four rubber bushings (400, FIG. 6 of '824) are arranged between a lower base plate (330, FIG. 6 of '824) arrange at an upper end of a chair leg (310, FIG. 6 of '824) and an upper seat plate (220, FIG. 6 of '824) arranged at a bottom surface of a chair seat (210, FIG. 6 of '824). Two ends of each rubber bushing (400, FIG. 6 of '824) are connected with two connectors (nipples 404, FIG. 6 of '824) having bolt(s) or screw(s) and used to provide the lower base plate (330, FIG. 6 of '824) to connect to the upper seat plate (220, FIG. 6 of '824) so as to form the structure shown as in FIG. 8 of '824. The chair seat (210, FIG. 6 of '824) is supported by the elastic deformation of the rubber bushing bodies (402, FIG. 6 of '824) so as to form multi-directional moving elastic buffering.

However, the chair structure with multi-directional moving elastic buffering as above mentioned is only depending on a single elastic buffering structure, such like the rubber bushing (400, FIG. 6 of '824), so that the formed elastic buffering is limited. One of the disadvantages is the insufficient elastic buffering in use.

Please refer to FIG. 7 of the present invention, it is illustrated the rubber bushing body (402, FIG. 8 of '824) while being deformed. Because the buffering elasticity of the above mentioned rubber bushing (400 of '824) is insufficient, the rubber bushing bodies (402, of '824) may be over loaded to break to two sections and lose the elastic buffering function once the expanding strength of the rubber bushing (400 of '824) with the multi-directional movement is larger than the limit force which the rubber bushing bodies (402, of '824) can take.

Finally, please refer to FIG. 8 of the present invention, it is illustrated another deformation structure of the rubber bushing body (402 of '824). When the expanding strength of the rubber bushing (400 of '824) with the multi-directional movement is larger than the limit of the connection of the rubber bushing body (402 of '824) and the connector (nipple 404 of '824), it may make the connector (nipple 404 of '824) be pulled out and separated from the rubber bushing body (402 of '824) so as to lose the elastic buffering function.

In conclusion, the chair structure with multi-directional moving elastic buffering has following disadvantages in use.

Firstly, the single elastic buffering structure may be formed finite elastic buffering to result in insufficient buffering elasticity and bad sitting feeling and comfort.

Secondly, when the elastic buffering is insufficient and the pulling force for moving the chair is larger than the loading of the rubber bushing body (402 of '824) being able to take, it may be broken to two sections and lost the elastic buffering function.

Thirdly, when the expanding strength of the rubber bushing (400 of '824) with the multi-directional movement is larger than the limit of the connection of the rubber bushing body (402 of '824) and the connector (nipple 404 of '824), it may make the connector (nipple 404 of '824) be pulled out and separated from the rubber bushing body (402 of '824) so as to lose the elastic buffering function.

In view of the foregoing circumstances, the inventor has invested a lot of time to study the relevant knowledge, compare the pros and cons, research and develop related products. After quite many experiments and tests, the "topple-proof buffering structure for a chair" of this invention is eventually launched to improve the foregoing shortcomings, to meet the public use.

SUMMARY OF THE INVENTION

How to solve the problems of the prior art is the critical purpose of the present invention. The problems are described as follows. Firstly, the buffering elasticity is insufficient due to the use of a single elastic buffering structure to result in the sitting feeling and comfort are bad. Secondly, the rubber bushing body as above mentioned may be snapped to lose the buffering function. Thirdly, the connector (the nipple 404 in US2014/0252824) as above mentioned may be pulled out to separate from the rubber bushing body.

The first object of this invention is providing a topple-proof buffering structure for a chair. The deforming buffering portions are bent to deform and the flexible pillars are expanded to deformed so that the better geometry suspension and better elastic buffering are formed to support the seat and then the sitting feeling and comfort are effectively increased and improved.

The second object of this invention is providing a topple-proof buffering structure for a chair. The bolt member and the screw hole member arranged at two ends of the flexible pillar are connected with each other with the limit screw so as to support the flexible pillar not to be damaged and broken due to elastic deformation.

In order to achieve above mentioned object, a topple-proof buffering structure for the chair comprises an elastic supporting plate, connected to a fixing substrate of a chair leg of the chair, two deforming buffering portions are respectively arranged at two ends of the elastic supporting plate and protruded from an outer side of the fixing substrate; a seat fixing plate, assembled to a bottom side of a seat of the chair; and a plurality of flexible pillars, each end thereof has a bolt member, a screw hole member, and a limit screw for connecting the bolt member with the screw hole member which are embedded therein, the bolt member has an embedding end and an outer threading section protruded from one end of the corresponding flexible pillar, an inner screw hole is arranged at a surface of the embedding end, the outer threading section is assembled to the seat fixing plate, the screw hole member has a screw hole for assembling to the corresponding deforming buffering portion, one end of the screw hole member opposite to the screw hole has a small diameter hole and a retaining lip, the retaining lip is arranged between the screw hole and the small diameter hole and adjacent to the small diameter hole, the limit screw is passed through the small diameter hole of the screw hole member and screwed in the inner screw hole of the bolt member, the limit screw is used for connecting the screw hole member with the bolt member, and supporting the flexible pillars not to be damaged and broken due to elastic deformation, the limit screw of each flexible pillar is screwed in and out the inner screw hole, a buffering deformation of each flexible pillar is adjusted based on a distance change between a screw head of the limit screw and the retaining lip.

In some embodiments, the elastic supporting plate has a plurality of fixing holes assembled to corresponding fixing substrate of the chair leg, and two elastic sheets are respectively extended from two sides of each deformed portion and a connection hole is arranged at an outer end thereof.

In some embodiments, the seat fixing plate has a reinforcing portion for thickening, the reinforcing portion has a plurality of reinforcing fixing holes for assembling to the corresponding outer threading section, the seat fixing plate has two connection sheets for connecting to the seat, and each of the two connection sheets has a plurality of connection screws.

In some embodiments, a number of the flexible pillars is equal to a number of the elastic sheets, a first embedding ring groove is arranged at a peripheral of the embedding end of the bolt member for tightly fastening to the flexible pillars, and a second embedding ring groove is arranged at a peripheral of the screw hole member for tightly fastening to the flexible pillars.

The various objects and advantages of the present invention will be more readily understood from the following detailed description when read in conjunction with the appended drawing.

DETAILED DESCRIPTION OF THE INVENTION

Figure 1:
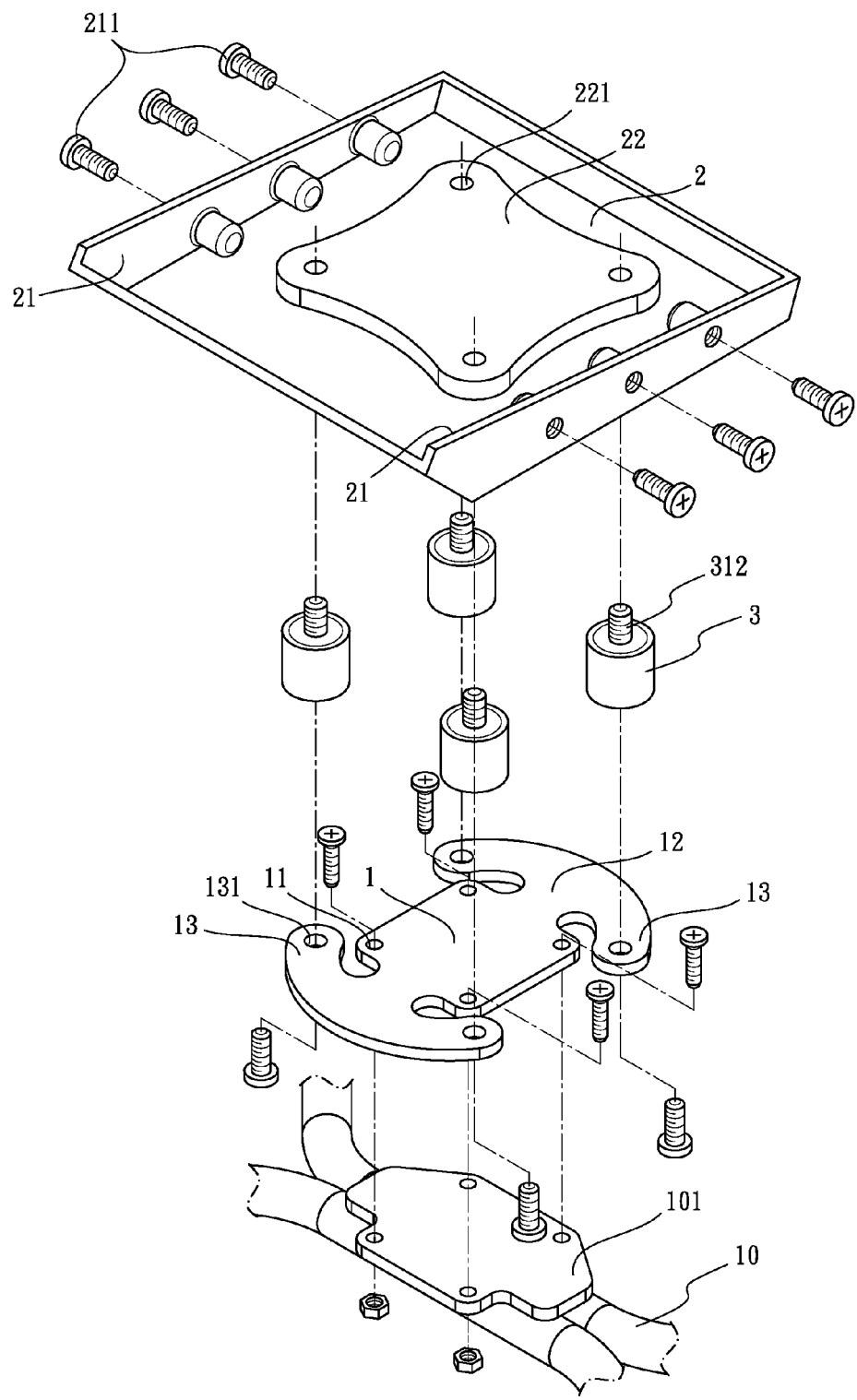
FIG. 1 is an exploded view of a topple-proof buffering structure for a chair of the present invention.
Figure 2:
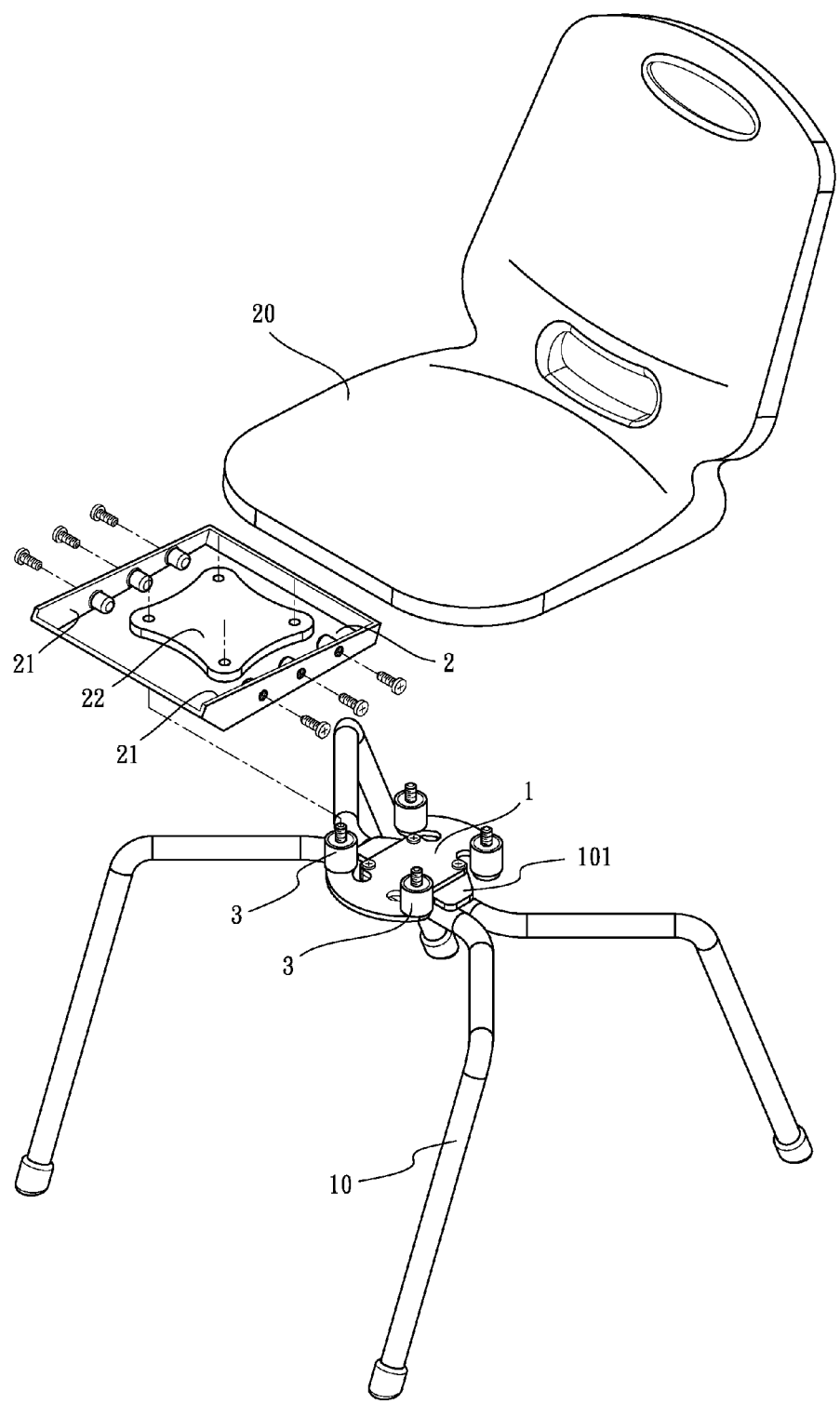
FIG. 2 is a perspective view of the topple-proof buffering structure for the chair of the present invention which is assembled to a char leg and a seat of the chair.

To describe clearly that the present invention achieves the foregoing object and function, the technical features and desired function are described with reference to a preferred embodiment and accompanying drawings.

Please reference to FIGS. 1 to 4, a topple-proof buffering structure for a chair of the present invention may comprise an elastic supporting plate 1, a seat fixing plate 2, and a plurality of flexible pillars 3. The elastic supporting plate 1 is connected to a fixing substrate 101 of a chair leg 10 of the chair. Two deforming buffering portions 12 are respectively arranged at two ends of the elastic supporting plate 1 and protruded from an outer side of the fixing substrate 101. The seat fixing plate 2 is assembled to a bottom side of a seat 20 of the chair. Each end of the flexible pillars 3 has a bolt member 31, a screw hole member 32, and a limit screw 33 for connecting the bolt member 31 with the screw hole member 32 which are embedded therein. The bolt member 31 has an embedding end 311 and an outer threading section 312 protruded from one end of the corresponding flexible pillar 3. An inner screw hole 313 is arranged at a surface of the embedding end 311. The outer threading section 312 is assembled to the seat fixing plate 2. The screw hole member 32 has a screw hole 321 for assembling to the corresponding deforming buffering portion 12. One end of the screw hole member 32 opposite to the screw hole 321 has a small diameter hole 322 and a retaining lip 323. The retaining lip 323 is arranged between the screw hole 321 and the small diameter hole 322 and adjacent to the small diameter hole 322. The limit screw 33 is passed through the small diameter hole 322 of the screw hole member 32 and screwed in the inner screw hole 313 of the bolt member 31. The limit screw 33 is used for connecting the screw hole member 32 with the bolt member 31, and supporting the flexible pillars 3 not to be damaged and broken due to elastic deformation. The limit screw 33 of each flexible pillar 3 is screwed in and out the inner screw hole 313. A buffering deformation of each flexible pillar 3 is adjusted based on a distance change between a screw head 331 of the limit screw 33 and the retaining lip 323.

The above mentioned embodiment is the main skill feature of this invention and corresponds to the claim 1 of this invention to understand the object and embodiments of this invention in detail. And the skill features of the depending claims are for describing the claim 1 in detail or adding more skill features, but not limited thereto. It should be known that the claim 1 is not necessary to include the skill features of the depending claims.

In FIGS. 1 to 4, the elastic supporting plate 1 has a plurality of fixing holes 11 assembled to corresponding fixing substrate 101 of the chair leg 10. Two elastic sheets 13 are respectively extended from two sides of each deformed portion 12 and a connection hole 131 is arranged at an outer end thereof. The seat fixing plate 2 has a reinforcing portion 22 for thickening. The reinforcing portion 22 has a plurality of reinforcing fixing holes 221 for assembling to the corresponding outer threading section 312 of the bolt member 31. The seat fixing plate 2 has two connection sheets 21 for connecting to the seat 20. Each of the two connection sheets 21 has a plurality of connection screws 211. In addition, a number of the flexible pillars 3 is equal to a number of the elastic sheets 13. A first embedding ring groove 314 is arranged at a peripheral of the embedding end 311 of the bolt member 31 for tightly fastening to the flexible pillars, and a second embedding ring groove 324 is arranged at a peripheral of the screw hole member 32 for tightly fastening to the flexible pillars 3.

Figure 5:
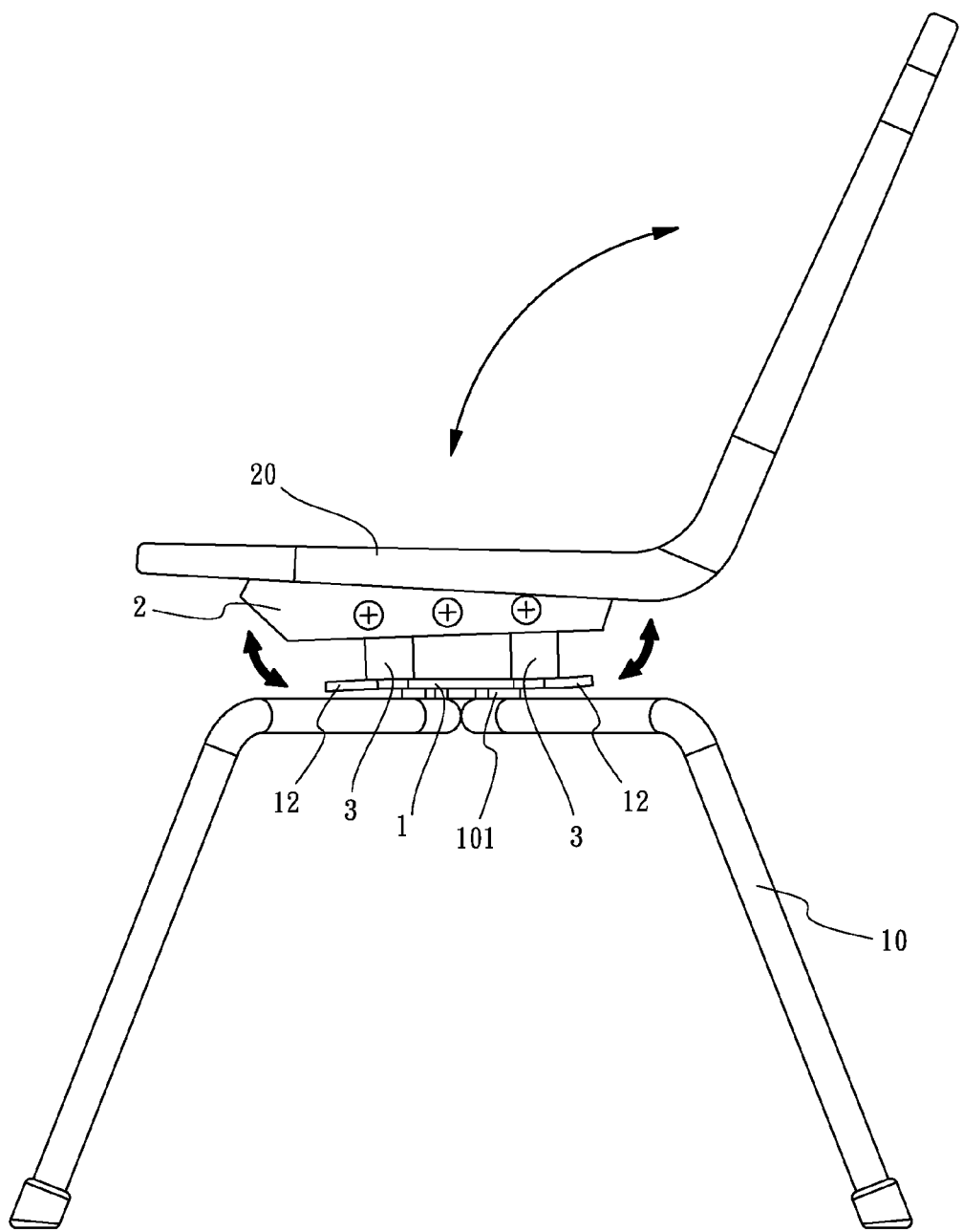
FIG. 5 is an operating view of the topple-proof buffering structure for the chair of the present invention for providing to support and elastically buffer the seat by bending, expanding, and contracting.

Please refer to FIG. 5, the two deforming buffering portion 12 of the elastic supporting plate 2 are respectively connected to the flexible pillars 3 which are expanded to deform and then supported between the chair leg 10 and the seat 20. Shown as the arrow in FIG. 5, when the seat 20 provided for sitting is forced along the direction of the arrow, the deforming buffering portions 12 arranged at two ends of the elastic supporting plate 1 is bent to deform and the flexible pillars 3 are expanded to deform so that the better geometry suspension and better elastic buffering are formed to support the seat 20 and then the sitting feeling and comfort are effectively increased and improved.

Figure 3:
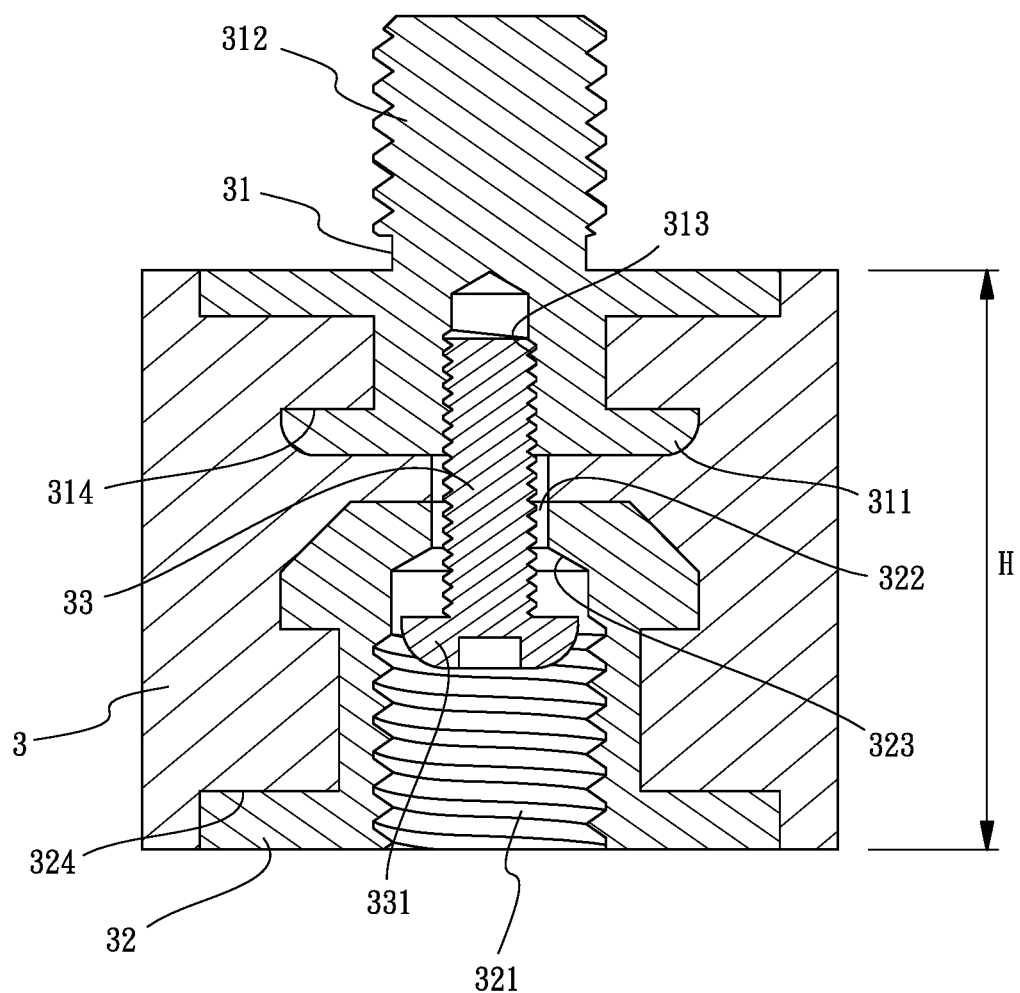
FIG. 3 is a cross-sectional view of the flexible pillars of the topple-proof buffering structure of the present invention.
Figure 4:
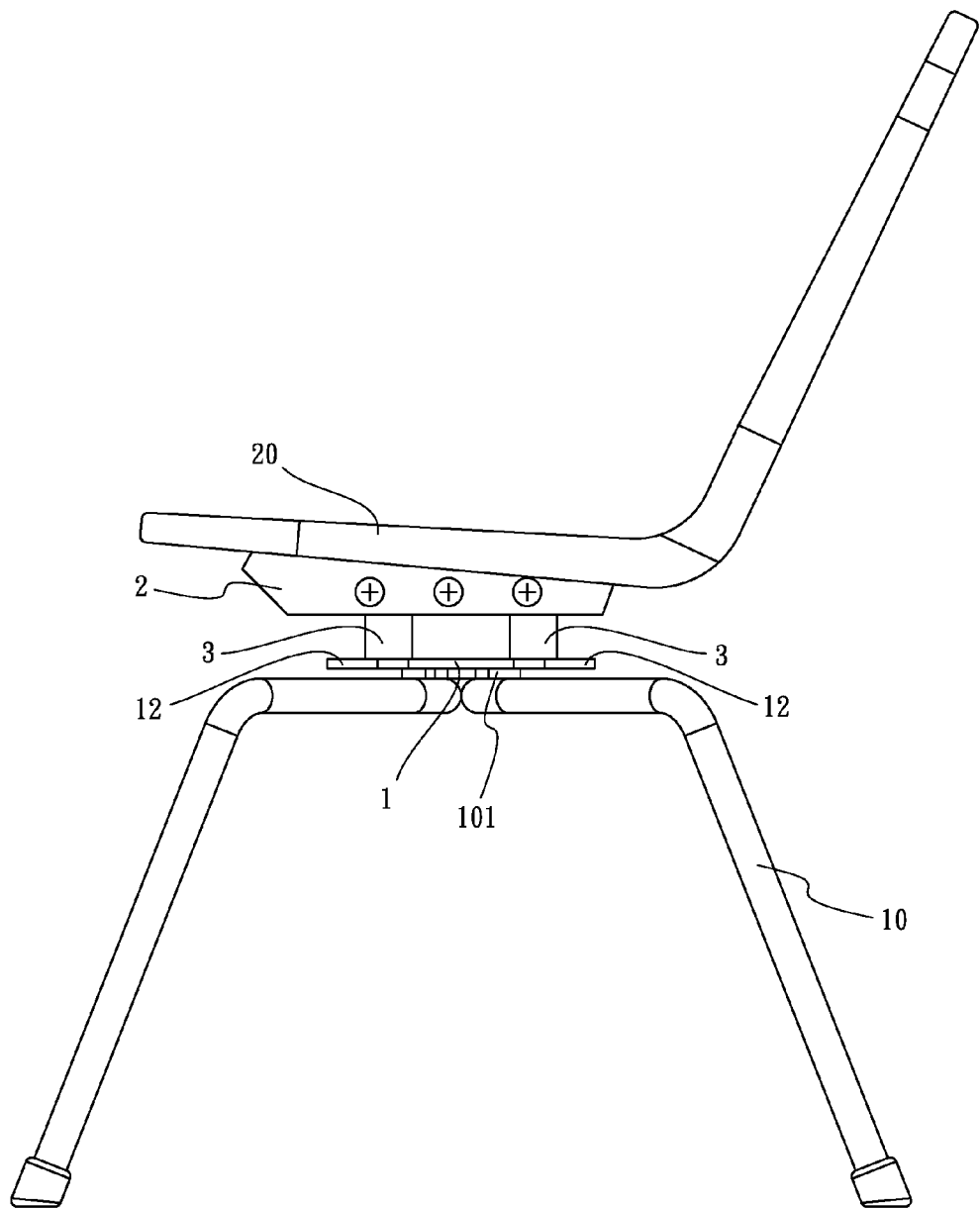
FIG. 4 is a plan view of the topple-proof buffering structure of the present invention.
Figure 6:
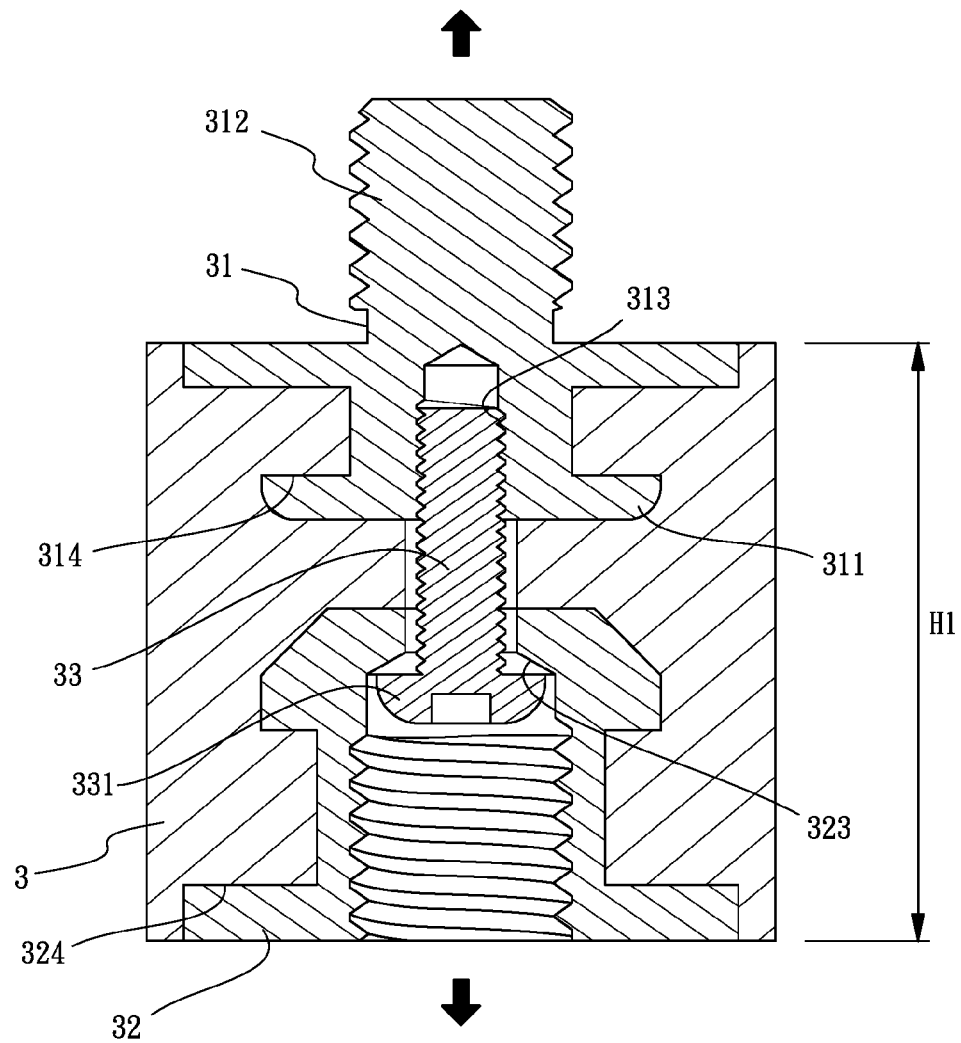
FIG. 6 is a cross-sectional view of the topple-proof buffering structure for the chair or the present while the limit screw is connected with the bolt member and the screw hole member respectively arranged at two ends of each flexible pillar to expand.
Figure 7:
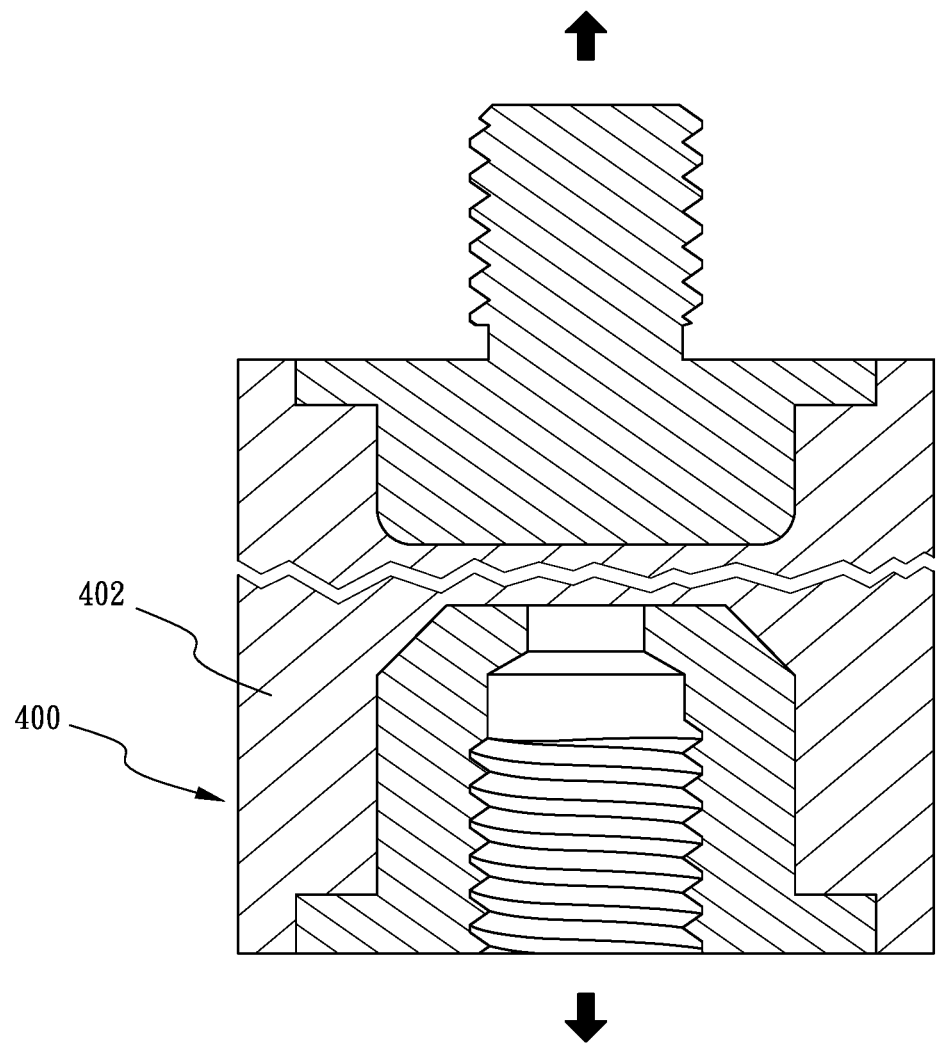
FIG. 7 is a structural view of FIG. 8 of the patent US2014/0252824 A1 whose rubber bushing body 402 is deformed.
Figure 8:
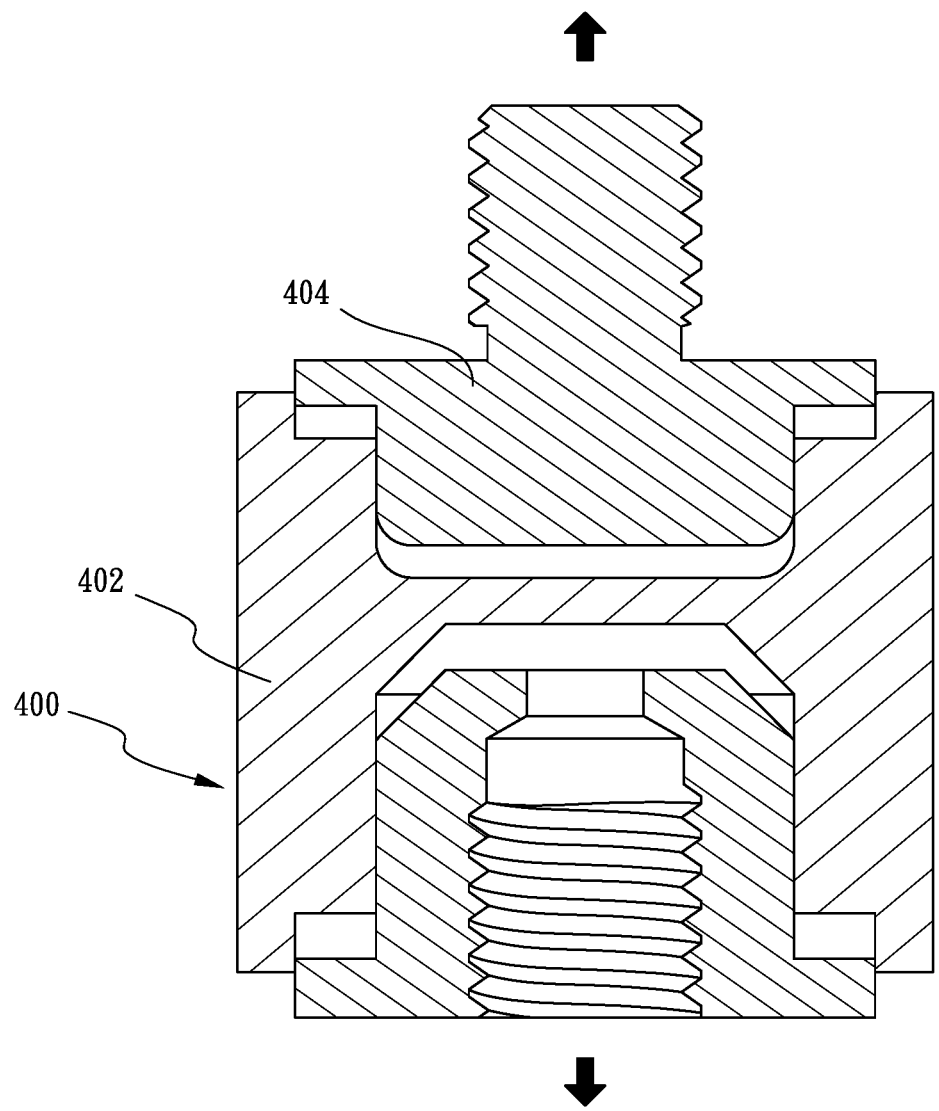
FIG. 8 is another structural view of FIG. 8 of the patent US2014/0252824 A1 whose rubber bushing body 402 is deformed.

In FIG. 6, the limit screw 33 is embedded to connect the bolt member 31 with the screw hole member 32 respectively arranged at two ends of the flexible pillar 3 so as to effectively support the flexible pillars not to be damaged and broken due to elastic deformation. In FIG. 3, The indication H is a height of the flexible pillar 3 before being expanded. Before the flexible pillar 3 is expanded, the head 331 of the limit screw 33 and the retaining lip 323 of the screw hole member 32 are spaced from each other with a distance. In FIG. 6, the indication H1 is a height of the flexible pillar 3 after being expended. When the flexible pillar 3 is expanded, the head 331 is abutted against the retaining lip 323 to limit the expansion of the flexible pillar 3 to prevent from being snapped. In addition, a depth of the limit screw 33 screwed in the inner screw hole 313 is different so that the head 331 of the limit screw 33 is close to or distant from the retaining lip 323 to adjust the buffering deformation of the flexible pillar 3.

Besides, in FIG. 6, the embedding ring grooves 314, 324 arranged at the peripherals of the bolt member 31 and the screw hole member 32 are used to be tightly fastened to the material structure of two ends of the flexible pillar 3 but not to be separated. It may achieve the effect of durable use.

As above descriptions, the elastic supporting plate 1 having two deforming buffering portions 12 is connected with the flexible pillar 3 which is capable for being expanded, contracted, and deformed to support between the chair leg 10 and the seat 20. Two ends of the flexible pillar 3 are respectively embedded between the bolt member 31 and the screw hole member 32 and connected with the bolt member 31 with the screw hole member 32 through the limit screw 33. The embedding ring grooves 314, 324 are respectively arranged at the peripherals of the blot member 31 and the screw hole member 32 so as to truly improve the disadvantages of the prior art. The advantages of the present invention are described as follows.

Firstly, the deforming buffering portions are bent to deform and the flexible pillars 3 are expanded to deformed so that the better geometry suspension and better elastic buffering are formed to support the seat 20 and then the sitting feeling and comfort are effectively increased and improved.

Secondly, the bolt member 31 and the screw hole member 32 arranged at two ends of the flexible pillar 3 are connected with each other with the limit screw 33 so as to support the flexible pillar 3 not to be damaged and broken due to elastic deformation.

Thirdly, the embedding ring grooves 314, 324 arranged at the peripherals of the bolt member 31 and the screw hole member 32 are used to be tightly fastened to the flexible pillar 3 not to be separated ad then to achieve the effect of durable use.

The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A topple-proof buffering structure for a chair, comprising:
    an elastic supporting plate, connected to a fixing substrate of a chair leg of the chair, two deforming buffering portions are respectively arranged at two ends of the elastic supporting plate and protruded from an outer side of the fixing substrate;
    a seat fixing plate, assembled to a bottom side of a seat of the chair; and
    a plurality of flexible pillars, each end thereof has a bolt member, a screw hole member, and a limit screw for connecting the bolt member with the screw hole member which are embedded therein, the bolt member has an embedding end and an outer threading section protruded from one end of the corresponding flexible pillar, an inner screw hole is arranged at a surface of the embedding end, the outer threading section is assembled to the seat fixing plate, the screw hole member has a screw hole for assembling to the corresponding deforming buffering portion, one end of the screw hole member opposite to the screw hole has a small diameter hole and a retaining lip, the retaining lip is arranged between the screw hole and the small diameter hole and adjacent to the small diameter hole, the limit screw is passed through the small diameter hole of the screw hole member and screwed in the inner screw hole of the bolt member, the limit screw is used for connecting the screw hole member with the bolt member, and supporting the flexible pillars not to be damaged and broken due to elastic deformation, the limit screw of each flexible pillar is screwed in and out the inner screw hole, a buffering deformation of each flexible pillar is adjusted based on a distance change between a screw head of the limit screw and the retaining lip.

2. The structure as claimed in claim 1, wherein the elastic supporting plate has a plurality of fixing holes assembled to corresponding fixing substrate of the chair leg, and two elastic sheets are respectively extended from two sides of each deformed portion and a connection hole is arranged at an outer end thereof.

3. The structure as claimed in claim 1, wherein the seat fixing plate has a reinforcing portion for thickening, the reinforcing portion has a plurality of reinforcing fixing holes for assembling to the corresponding outer threading section, the seat fixing plate has two connection sheets for connecting to the seat, and each of the two connection sheets has a plurality of connection screws.

4. The structure as claimed in claim 2, wherein a number of the flexible pillars is equal to a number of the elastic sheets, a first embedding ring groove is arranged at a peripheral of the embedding end of the bolt member for tightly fastening to the flexible pillars, and a second embedding ring groove is arranged at a peripheral of the screw hole member for tightly fastening to the flexible pillars.

* * * * *